US010133427B2

(12) United States Patent
Weng et al.

(10) Patent No.: US 10,133,427 B2
(45) Date of Patent: Nov. 20, 2018

(54) EMBEDDED TOUCH-SCREEN DISPLAY PANEL

(71) Applicant: HON HAI PRECISION INDUSTRY CO., LTD., New Taipei (TW)

(72) Inventors: Yu-Fu Weng, New Taipei (TW); Chien-Wen Lin, New Taipei (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 343 days.

(21) Appl. No.: 14/880,639

(22) Filed: Oct. 12, 2015

(65) Prior Publication Data

US 2016/0349875 A1 Dec. 1, 2016

(30) Foreign Application Priority Data

May 29, 2015 (TW) .............................. 104117350 A

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0412* (2013.01); *G06F 3/0416* (2013.01); *G09G 3/3648* (2013.01); *G06F 2203/04104* (2013.01); *G06F 2203/04112* (2013.01); *G09G 3/3674* (2013.01)

(58) Field of Classification Search
CPC ...... G06F 3/044; G06F 3/0412; G06F 3/0416; G06F 2208/04104; G06F 2203/04112; G09G 3/3648; G09G 3/3674
See application file for complete search history.

(56) References Cited

U.S. PATENT DOCUMENTS

2009/0009498 A1* 1/2009 Nishimura ........... G09G 3/3688
345/205
2009/0289912 A1* 11/2009 Chen ..................... G06F 3/0412
345/173
2011/0116019 A1* 5/2011 Hwang ................. G02F 1/1333
349/84

(Continued)

FOREIGN PATENT DOCUMENTS

CN 103970385 A 8/2014
CN 104238787 A 12/2014

(Continued)

*Primary Examiner* — Sejoon Ahn
(74) *Attorney, Agent, or Firm* — ScienBiziP, P.C.

(57) ABSTRACT

An embedded touch-screen display panel includes a first substrate and a second substrate sandwiching a driving circuit disposed on the second substrate. The second substrate also carries a touch electrode layer and a first selecting circuit. The driving circuit generates signals of touches and driving signals, and includes a plurality of touch detecting pins and a plurality of controlling pins. The touch electrode layer includes a plurality of touch electrodes. At least two touch electrodes are electrically connected to one touch detecting pin via the first selecting circuit. A touch signal is transmitted between the two touch electrodes and the touch detecting pin. The controlling pin generates signals to the first selecting circuit to establish or cut off electrical connections between the touch detecting pins and the touch electrodes.

5 Claims, 8 Drawing Sheets

(56) References Cited

U.S. PATENT DOCUMENTS

| | | | | |
|---|---|---|---|---|
| 2013/0215075 A1* | 8/2013 | Lee | ........................ | G06F 3/044 |
| | | | | 345/174 |
| 2013/0342498 A1* | 12/2013 | Kim | ........................ | G06F 3/044 |
| | | | | 345/174 |
| 2014/0049486 A1* | 2/2014 | Kim | ........................ | G06F 3/041 |
| | | | | 345/173 |
| 2014/0111476 A1* | 4/2014 | You | ...................... | G09G 3/3655 |
| | | | | 345/174 |

FOREIGN PATENT DOCUMENTS

| | | |
|---|---|---|
| TW | 201241532 A1 | 10/2012 |
| TW | 201335812 A1 | 9/2013 |
| TW | 201426457 A1 | 7/2014 |

\* cited by examiner

EMBEDDED TOUCH-SCREEN DISPLAY PANEL

CROSS-REFERENCE TO RELATED APPLICATIONS

This application claims priority to Taiwanese Patent Application No. 104117350 filed on May 29, 2015, the contents of which are incorporated by reference herein.

FIELD

The subject matter herein generally relates to an embedded touch-screen display panel.

BACKGROUND

Embedded touch-screen display panels are widely used in electronic devices. The embedded touch-screen display panel includes a display panel and a touch electrode layer disposed on the display panel. The touch electrode layer includes a plurality of touch electrodes, a driving circuit with a plurality of pins, and a signal processing circuit electrically connected to the driving circuit. The touch electrodes are electrically connected to the pins of the driving circuit through metal traces.

BRIEF DESCRIPTION OF THE FIGURES

Many aspects of the embodiments can be better understood with reference to the following drawings. The components in the drawings are not necessarily drawn to scale, the emphasis instead being placed upon clearly illustrating the principles of the electronic device and writing protection method thereof. Moreover, in the drawings, like reference numerals designate corresponding parts throughout the views.

DETAILED DESCRIPTION

Figure 1:
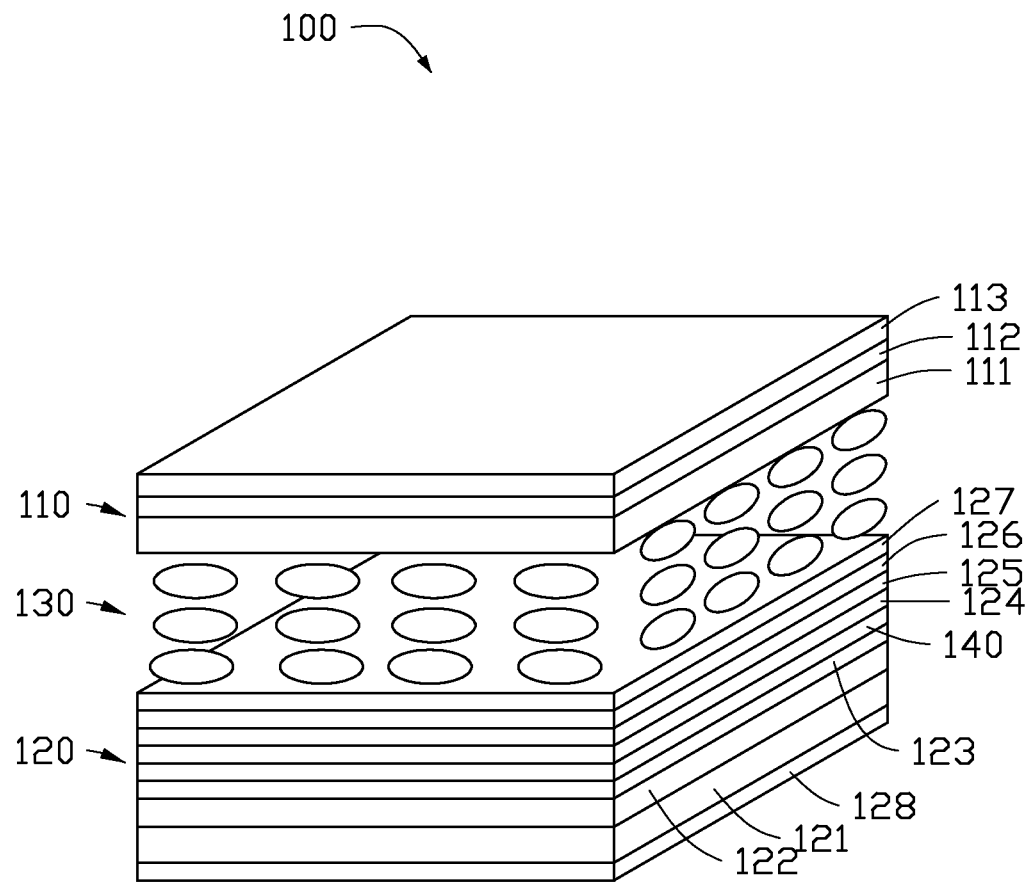
FIG. 1 is a diagram of an embodiment of an embedded touch-screen display panel, the embedded touch-screen display panel comprising a touch electrode layer and a display driver layer.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 illustrates an embodiment of an embedded touch-screen display panel 100. The embedded touch-screen display panel 100 includes a first substrate 110, a second substrate 120, and a liquid crystal layer 130 sandwiched between the first substrate 110 and the second substrate 130. In at least one embodiment, the embedded touch-screen display panel 100 is an in-cell touch-screen display panel, the first substrate 110 is a color filter substrate, and the second substrate is a thin film transistor (TFT) array substrate. In other embodiments, a display medium of the embedded touch-screen display panel 100 can be oil, water, or a combination of water and oil.

The first substrate 110 includes a first base 111, a color filter (CF) layer 112 formed on the first base 111, and a first polarizer 113 formed on a surface of the CF layer 112 away from the first base 111. The CF layer 112 is sandwiched between the first base and the first polarizer 113.

Figure 5:
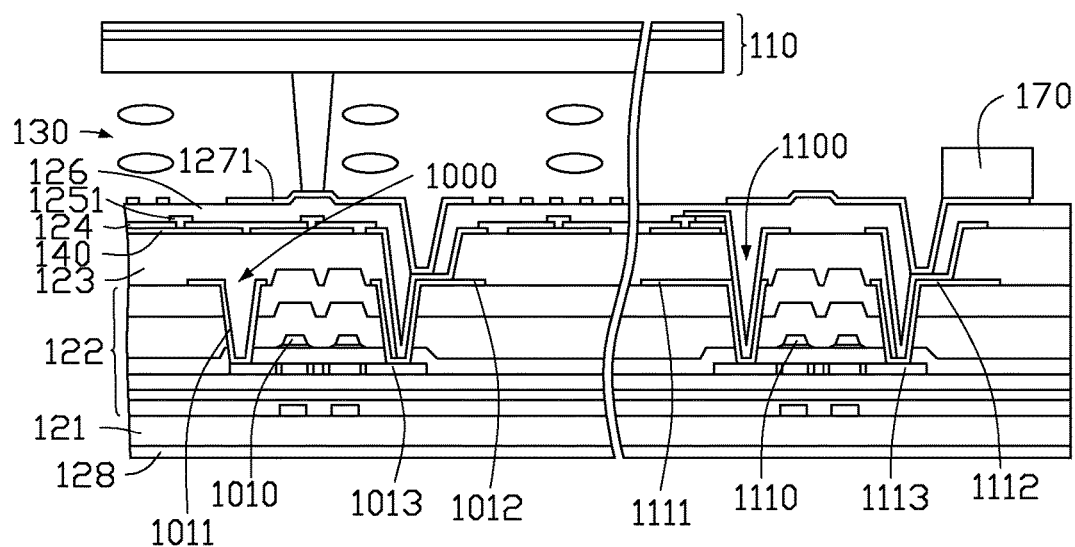
FIG. 5 is a cross-sectional view of the embedded touch-screen display panel of FIG. 1.

The second substrate 120 includes a second base 121, a display driver layer 122, a first insulating layer 123, a second insulating layer 124, a conducting layer 125, a third insulting layer 126, a pixel electrode layer 127, and a second polarizer 128. The display driver layer 122, the first insulating layer 123, the second insulating layer 124, the conducting layer 125, the third insulting layer 126, and the pixel electrode layer 127 are orderly overlapped on a surface of the second base 121 adjacent to the liquid crystal layer 130. The pixel electrode layer 127 includes a first gate electrode 1010 (as shown in FIG. 5), a first source electrode 1011 (as shown in FIG. 5), a first drain electrode 1012 (as shown in FIG. 5), and a first channel layer (not labeled). The first gate electrode 1010 connects a corresponding scan line 1221, the first source electrode 1012 connects a corresponding a data line, and the drain electrode 1012 is electrically connected to a corresponding pixel electrode 1271. The second polarizer 128 is disposed on a surface of the second base 121 away from the liquid crystal layer 130. In at least one embodiment, the first base 111 and the second base 121 are made of transparent material, such as glass.

The embedded touch-screen display panel 100 further includes a touch electrode layer 140. The touch electrode layer 140 is formed on a side of the second substrate 120 adjacent to the liquid crystal layer 130. In at least one embodiment, the touch electrode layer 140 is formed on the TFT array substrate. The touch electrode layer 140 may be operable in a display mode and a touch-sensing mode. In the display mode, the touch electrode layer 140 serves as a common electrode layer, cooperating with the pixel electrode layer 127 to induce an electric field for manipulating liquid crystals of the liquid crystal layer 130. In the touch-sensing mode, the touch electrode layer 140 may sense touches on the embedded touch-screen display panel.

Figure 2:
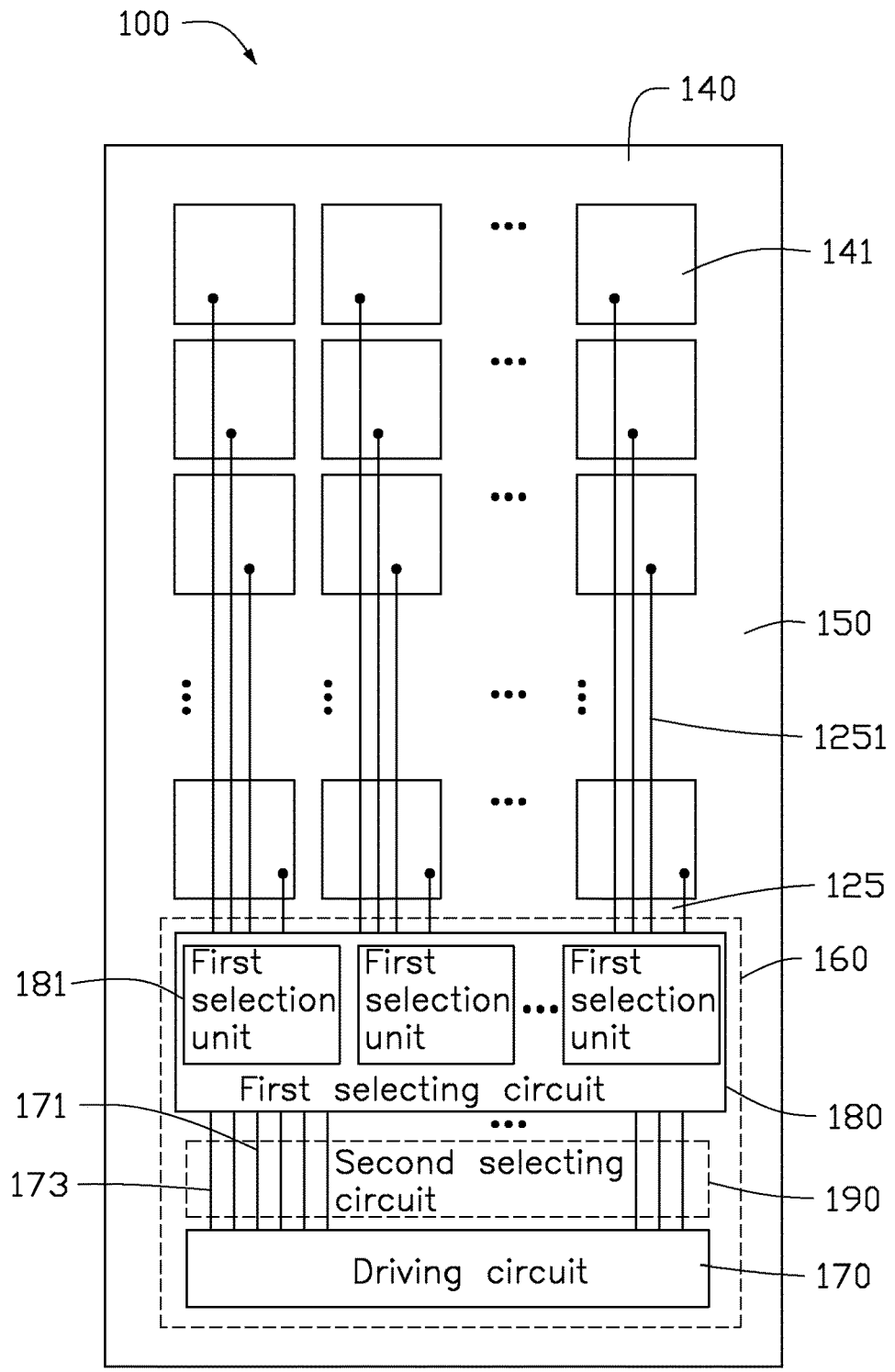
FIG. 2 is a diagrammatic view of an embodiment of the touch electrode layer of FIG. 1.

FIG. 2 illustrates an embodiment of the touch electrode layer 140. The embedded touch-screen display panel 100 further includes a display region 150, a non-display region 160 surrounding the display region 150, a driving circuit 170 located in the non-display region 160, a first selecting circuit 180, and a second selecting circuit 190. The touch electrode layer 140 includes a plurality of touch electrodes 141, each electrode being insulated from each other, in the display region 150. The touch electrodes 141 are arranged in a matrix. Each touch electrode 141 is substantially rectangular in shape. The touch electrodes 141 are electrically connected to the first selecting circuit 180 via conductive lines 1251 of the conducting layer 125. In at least one embodiment, the conductive lines 1251 can be made of metal.

The driving circuit 170 is electrically connected to the first selecting circuit 180 and the second selecting circuit 190. The driving circuit 170 generates signals caused by touches (touch signals) for driving the touch electrode 141 and sensing touches by passing the first selecting circuit 180. The driving circuit 170 further passes a feedback signal to a processor (not shown) to identify a touch operation. The driving circuit 170 includes a plurality of touch detecting pins 171, a plurality of display detecting pins 172 (shown in FIG. 3), and a plurality of controlling pins 173, all of which being insulated from each other. A portion of the touch electrodes 141 are electrically connected to the touch detecting pins 171 via the first selecting circuit 180. Touch detecting pin 171 generates the touch signal to the first selecting circuit 180. The display detecting pins 172 transfer display signal to the pixel electrodes 1271 and the touch electrodes 141, forming an electric field to control orientation of liquid crystals of a liquid crystal layer 130. The controlling pins 173 are electrically connected to the first selecting circuit 180. The controlling pins 173 are configured to control the first selecting circuit 180. In at least one embodiment, the driving circuit 170 drives the controlling pins 173 to generate a driving signal for displaying images, which drives the first selecting circuit 180 to work. The driving circuit 170 is a chip integrating a touch and a display function. The touch signal is a combination of touch driving signal and touch sensing signal. The touch detecting pin 171 and the display detecting pin 172 transmit data in alternating time periods.

The first selecting circuit 180 is configured to establish an electrical connection between the touch detecting pin 171 and the touch electrode 141 for transferring the touch driving signal to the touch electrode 141. The first selecting circuit 180 can also transfer a touch sensing signal generated by the touch electrode 141 to the touch detecting pin 171. A touch signal is composed by the touch driving signal and the touch sensing signal. The first selecting circuit 180 includes a plurality of first selection units 181. The first selection units 181 are electrically connected to the controlling pins 173. The first selection units 181 are controlled by the controlling pins 173 so as to establish or cut off an electrical connection. The driving circuit 170 orderly selects one of the first selection units 181 in one time period for driving the touch electrode 141.

Figure 3:
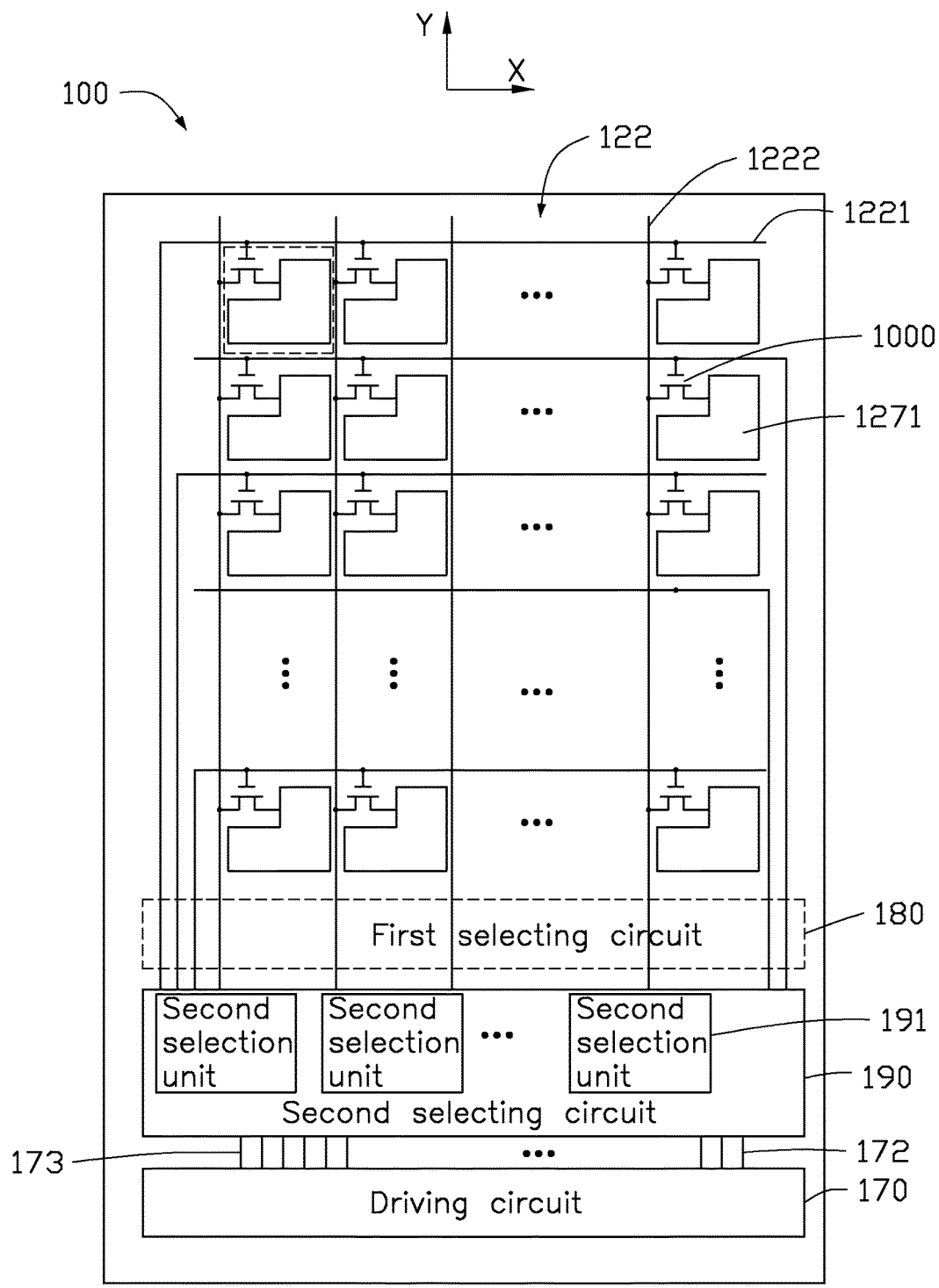
FIG. 3 is a diagrammatic view of an embodiment of the display driver layer of FIG. 1, the display driver layer comprising a first selection unit.

FIG. 3 illustrates an embodiment of the display driver layer 122. The second selecting circuit 190 includes a plurality of second selection units 191. The second selection units 191 are electrically connected to the display detecting pins 172 and the controlling pin 173. The embedded touch-screen display device 100 further includes a plurality of scan lines 1221, a plurality of parallel data lines 1222, and a plurality of first TFTs 1000. The data lines 1222 are perpendicular to the scan lines 1221 and insulated from the scan lines 1221. A first TFT 1000 is located at intersections of the scan lines 1221 and the data lines 1221. A first gate electrode 1100 of the first TFT 1000 is electrically connected to the scan line 1221, a first source electrode 1111 of the first TFT 1000 is electrically connected to the data line 1222, and a first drain electrode 1112 of the first TFT 1000 is electrically connected to the pixel electrode layer 127. In at least one embodiment, at least two of the scan lines 1221 or the data lines 1222 are electrically connected to the display detecting pins 172 via one of the second selection units 191. A structure of the second selection unit 191 is equivalent to a structure of the first selection unit 181.

The first selection units 181 and the second selection units 191 enable a number of channels connected to the display driver 170 and a number of the pins of the driving circuit 170 to be reduced, thus a number of the touch electrodes 141 is increased.

Figure 4:
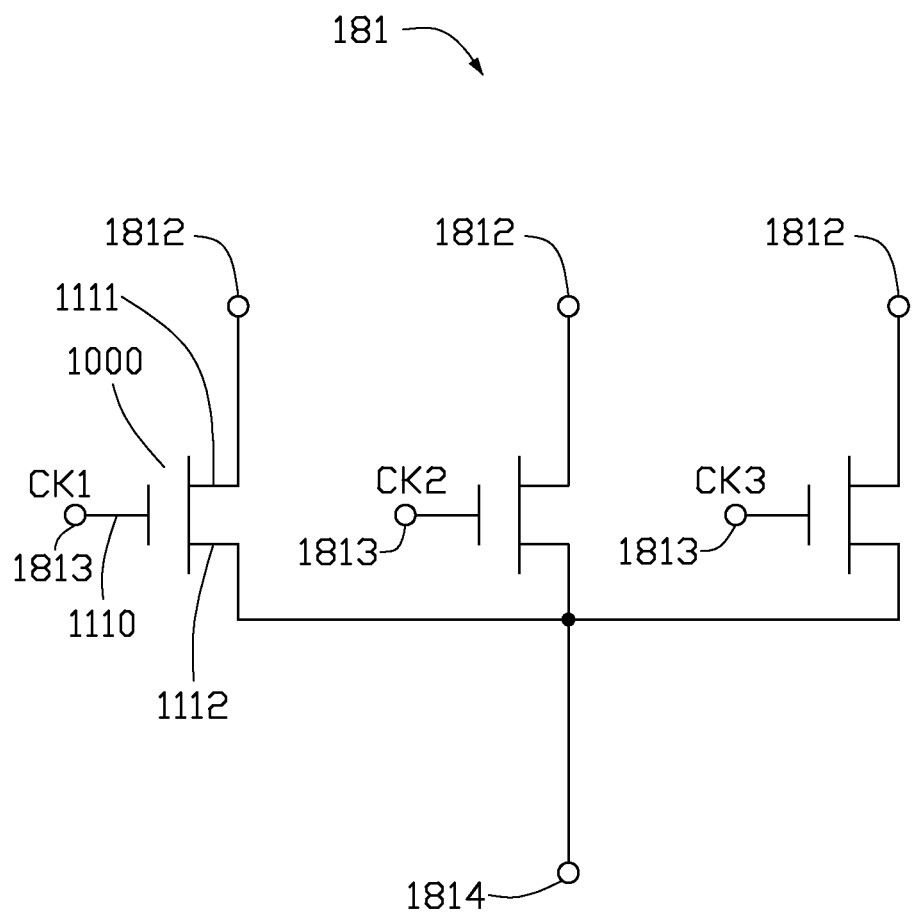
FIG. 4 is a diagrammatic view of a first embodiment of the first selection unit of FIG. 3.

FIG. 4 illustrates an embodiment of the first selection unit 181. The first selection unit 181 includes three controlling pins 1813, an inputting pin 1814, and three outputting pins 1812. The controlling pins 1813 are electrically connected to the controlling pins 173 of the driving circuit 170 for receiving the driving signals CK1-CK3 from the controlling pins 173 of the driving circuit 170. The outputting pins 1812 are electrically connected to the touch electrode 141. The inputting pin 1814 is electrically connected to the touch detecting pin 171. The controlling pin 1813 controls the outputting pin 1812 to connect electrically with the inputting pin 1814 based on the driving signal. In at least one embodiment, the first selection unit 181 includes three second TFTs 1000, each of which includes a second gate electrode 1110, a second source electrode 1112, and a second drain electrode 1111. The second gate electrode 1110 serves as the controlling pin 1813, the second source electrode 1111 serves as the outputting pin 1812, and the second drain electrode 1112 serves as the inputting pin 1814. A number of the second TFTs 1000 is equivalent to a number of the touch electrodes 141. In other embodiments, a number of the second TFTs 1000 is larger than three. When there are four second TFTs 1000, an area of the touch electrode 141 can be decreased, and a resolution of the embedded touch-screen display panel 100 is improved.

FIG. 5 illustrates an embodiment of the embedded touch-screen display panel 100. The first TFT 1000 is located on a surface of the second base 121. The first TFT 1000 further includes a first channel layer 1013 covered by a gate insulating layer (not labeled). The first gate electrode 1100 is disposed on the gate insulating layer on the second base 121. The first gate electrode 1111 and the first drain electrode 1112 are electrically connected through holes (not labeled) to opposite ends of the first channel layer 1013. The first source electrode 1111 is electrically connected to one data line 1221 on the same layer, and the first gate electrode 1100 is electrically connected to one scan line 1222 on the same layer. In at least one embodiment, the first TFT 1000 is a dual-gate type transistor of low temperature poly-silicon. In other embodiments, the first TFT 1000 can be a signal-gate type transistor.

The embedded touch-screen display panel 100 further includes a first insulating layer 123, a second insulating layer 124, and a third insulating layer 126. The touch electrodes 141 are located on a surface of the first insulating layer 123 adjacent to the liquid crystal layer 130. The conductive lines 1251 on a surface of the second insulating layer 124 are electrically connected to the touch electrode 141 via through holes in the second insulating layer 124. The third insulating layer 126 covers the conducting layer 125. The pixel electrode layer 127 is disposed on the third insulating layer 126. The pixel electrodes 1271 are electrically connected to the first drain electrode 1112 by through holes (not labeled) in the third insulating layer 126.

The second TFT 1100 located on the second base 121 further includes a second channel layer 1113. A through hole (not labeled) electrically connects the second gate electrode 1110 and the driving circuit 170. A through hole (not labeled) in the third insulating layer 126 electrically connects the second source electrode 1111 and the metal trace 1251. A through hole (not labeled) in the layer 126 electrically connects the second drain electrode 1112 and the driving circuit 170. In at least one embodiment, the driving circuit 170 is located in the non-display region 160 by a conductive matter, such as solder.

Figure 6:
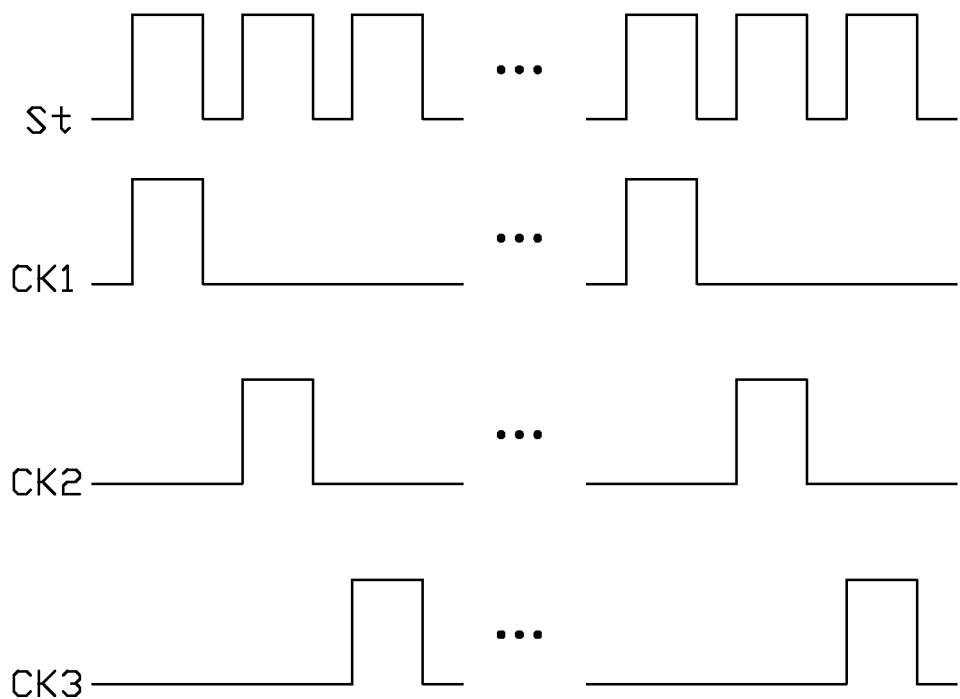
FIG. 6 is a diagram of waveforms of an embodiment of the first selection unit of FIG. 4.

FIG. 6 illustrates a time sequence of the first selection unit 181. "St" denotes a waveform of the touch signal. CK1-CK3 denote waveforms indicating the driving signal being input to the first selection unit 181. In at least one embodiment, the touch signal and the driving signal are pulse signals. In other embodiments, the touch signal and the driving signal can be sine, square, or triangular waveforms.

The driving signals CK1-CK3 are orderly provided to the controlling pins 1812. When receiving the driving signals CK-CK3, the second TFT 1000 turns on and an electrical connection between the inputting pin 1814 and the outputting pin 1812 is established, thus the touch signal St is transmitted to the touch electrode 141 through the driving circuit 170 or transmitted to the driving circuit 170 through the touch electrode 141.

Since at least two of the touch electrodes 141 are connected to one touch detecting pin 171 via the first selecting circuit 180, a number of the touch detecting pin 171 is decreased and a resolution of the embedded touch-screen display panel 100 is improved. Further, the first selecting circuit 180 and the second selecting circuit 190 can be directly manufactured and formed in the non-display region 160, thus a signal transmitting speed and an interference-reduction performance of the embedded touch-screen display panel 100 are improved.

Figure 7:
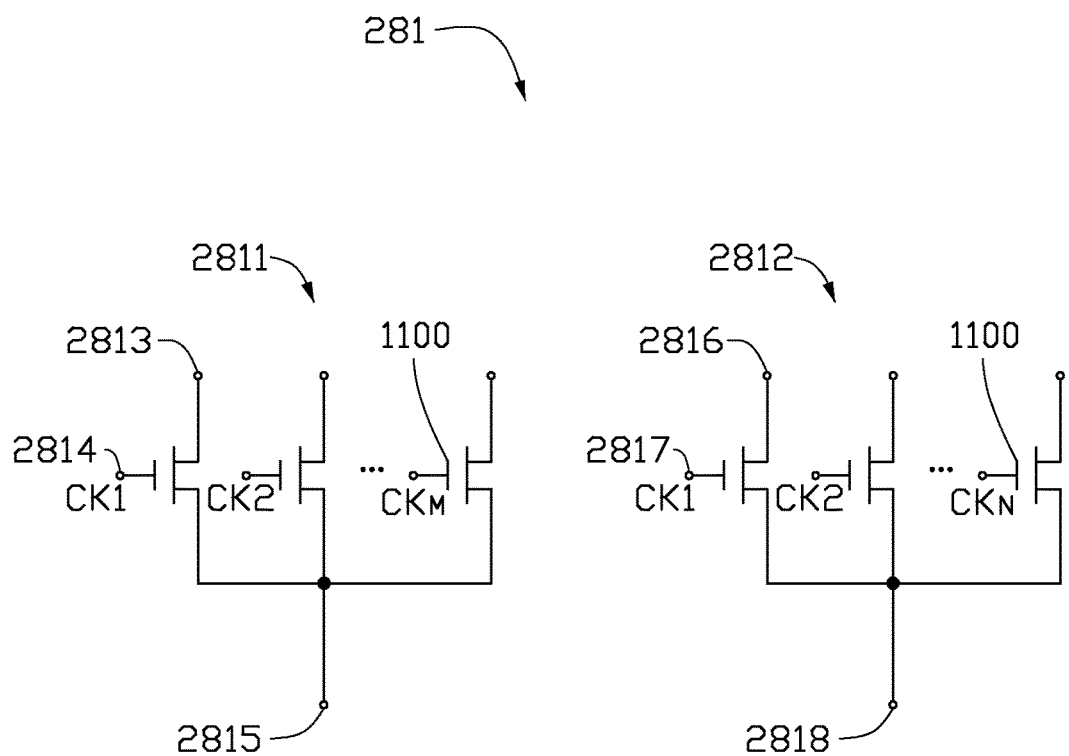
FIG. 7 is a diagrammatic view of a second embodiment of the first selection unit of FIG. 3.

FIG. 7 illustrates a second embodiment of the first selection unit 281. The first selection unit 281 includes a first sub-selection unit 2811 and a second sub-selection unit 2812. The first sub-selection unit 2811 includes a first inputting pin 2815, a plurality of first outputting pins 2813, and a plurality of first controlling pins 2814 corresponding to the first outputting pin 2813. The second sub-selection unit 2811 includes a second inputting pin 2818, a plurality of second outputting pins 2816, and a plurality of second controlling pins 2817 corresponding to the second outputting pins 2816. A number of the first outputting pins 2813 is different from a number of the second outputting pins 2816. The first controlling pins 2814 and the second controlling pins 2816 are electrically connected to the driving circuit 170 for receiving driving signals from the driving circuit 170. The first outputting pins 2813 and the second outputting pins 2816 are electrically connected to the touch electrodes 141. The first inputting pin 2815 and the second inputting pin 2818 are electrically connected to the driving circuit 170 for transmitting touch signals St1-St2. In at least one embodiment, a phase of the touch signal provided to the first sub-selection unit 2811 is opposite to a phase of the touch signal provided to the second sub-selection unit 2812. Each of the first sub-selection unit 2811 and the second sub-selection unit 2812 includes a plurality of second TFTs 1100. Each of the second TFTs 1100 includes a second gate electrode 1110, a second source electrode 1112, and a second drain electrode 1111. The second gate electrode 1110 serves as the first controlling pins 2814 or as the second controlling pins 2818, and the drain electrode 1111 serves as the first inputting pin 2815 or the second inputting pin 2818.

Figure 8:
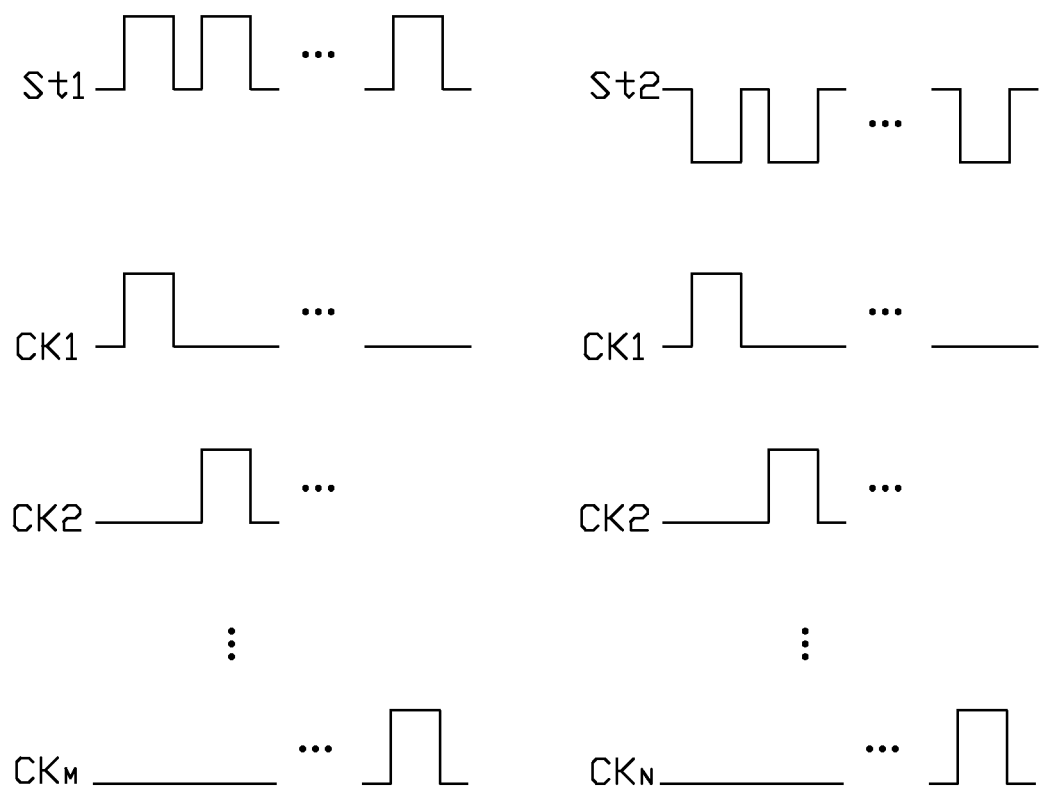
FIG. 8 is a diagram of waveforms of an embodiment of the first selection unit of FIG. 7.

FIG. 8 illustrates an embodiment of a time sequence of the driving circuit 170. St1 and St2 are waveforms of the touch signal provided to the first sub-selection unit 2811 and the second sub-selection unit 2812. CK1-CKm are waveforms indicating the driving signal being input to the first sub-selection unit 2811. CK1-CKn are waveforms indicating the driving signal being input to the second sub-selection unit 2812. In at least one embodiment, the touch signals St1-St2 and the driving signal CK1-CKm and CK1-CKn are pulse signals. In other embodiments, the touch signals St1-St2 and the driving signals CK1-CKm and CK1-CKn can be sine, square, or triangular waveforms.

The driving signals CK1-CKm are orderly provided to the first controlling pins 2814. When receiving the driving signals CK-CKm, the second TFT 1100 in the first sub-selection unit 2811 turns on and an electrical connection between the first inputting pin 2815 and the first outputting pin 2813 is established. Thereby, the touch signal St1 is transmitted to the touch electrode 141 through the driving circuit 170 or is transmitted to the driving circuit 170 through the touch electrode 141. The driving signals CK1-CKn are orderly provided to the second controlling pins 2814. When receiving the driving signals CK-CKn, the second TFT 1100 in the second sub-selection unit 2812 turns on and an electrical connection between the second inputting pin 2818 and the second outputting pin 2816 is established, and thereby the touch signal St2 is transmitted to the touch electrode 141 through the driving circuit 170 or is transmitted to the driving circuit 170 through the touch electrode 141.

At least two of the touch electrodes 141 being connected to one touch detecting pin 171 via the first selecting circuit 180 reduces a number of the touch detecting pins 171, and a resolution of the embedded touch-screen display panel 100 is improved. Further, the first selecting circuit 180 and the second selecting circuit 190 are directly manufactured and formed in the non-display region 160, thus improving signal transmitting speed and interference-reduction of the embedded touch-screen display panel 100.

While various embodiments have been described, the disclosure is not to be limited thereto. Various modifications and similar arrangements (as would be apparent to those skilled in the art) are also intended to fall within this disclosure. The scope of the appended claims should be accorded the broadest interpretation so as to encompass at least all such modifications and similar arrangements.

What is claimed is:

1. An embedded touch-screen display panel comprising:
   a first substrate;
   a second substrate opposite to the first substrate;
   a driving circuit disposed on the second substrate and configured to generate touch signals for sensing touch contacts and driving signals, the driving circuit comprising a plurality of touch detecting pins and a plurality of controlling pins;
   a touch electrode layer disposed on the second substrate and comprising a plurality of touch electrodes;
   a first selecting circuit configured to receive the driving signals;
   a second selecting circuit;

a plurality of scan lines; and
a plurality of data lines parallel with each other;
wherein the touch signals comprise touch driving signals and touch sensing signal;
the driving signal from the controlling pin controls the first selecting circuit to establish or cut off electrical connections between the plurality of touch detecting pins and the corresponding touch electrodes; the first selecting circuit is electrically connected between the plurality of touch electrodes and the plurality of touch detecting pins, each of the plurality of touch detecting pins corresponds to at least two of the plurality of touch electrodes; when the first selection circuit establishes the connections between the plurality of touch electrodes and the plurality of touch detecting pins, the first selecting circuit transmits the touch driving signals from the touch detecting pins to the corresponding touch electrodes;
wherein the driving circuit further comprises a plurality of display detecting pins; the second selecting circuit is electrically connected between the display detecting pins and the data lines, and is electrically connected between the controlling pins and the scan lines;
wherein each of the first selecting circuit and the second selecting circuit comprises a plurality of selection units; each of the selection units comprises three controlling pins, an inputting pin, and three outputting pins corresponding to the controlling pins; the controlling pins respectively receive the driving signals from the driving circuit the outputting pins are electrically connected to the touch electrodes; the controlling pin controls the corresponding outputting pin to connect with the inputting pin based on the driving signal;
wherein the selection unit comprises at least two first TFTs each of which comprises a second gate electrode, a first source electrode and a second drain electrode, the second gate electrode of the at least two first TFTs is severed as the controlling pin, the second source electrode of the at least two first TFTs is served as the outputting pin, and the second drain electrode of the at least two first TFTs is served as the inputting pin.

2. The embedded touch-screen display panel of claim 1, wherein a number of the at least two first TFTs in the selection unit is equivalent to a number of the touch electrodes.

3. The embedded touch-screen display panel of claim 1, wherein each of the first selecting circuit and the second selecting circuit comprises a plurality of selection units; the selection unit comprises a first sub-selection unit and a second sub-selection unit; the first sub-selection unit comprises a first inputting pin, a plurality of first outputting pins, and a plurality of first controlling pins corresponding to the first outputting pin; the second sub-selection unit comprises a second inputting pin, a plurality of second outputting pins, and a plurality of second controlling pins corresponding to the second outputting pins; the driving circuit generates different driving signals to the first controlling pin and the second controlling pin; the first inputting pin and the second inputting pin are capable of transferring the touch signal simultaneously.

4. The embedded touch-screen display panel of claim 3, wherein a phase of the touch signal provided to the first sub-selection unit is opposite to a phase of the touch signal provided to the second sub-selection unit.

5. The embedded touch-screen display panel of claim 3, wherein a number of the first outputting pins is different from a number of the second outputting pins.

* * * * *